Aug. 13, 1935. H. FISH 2,011,273
REVOLVING CENTER FOR MACHINE TOOLS
Filed June 1, 1934
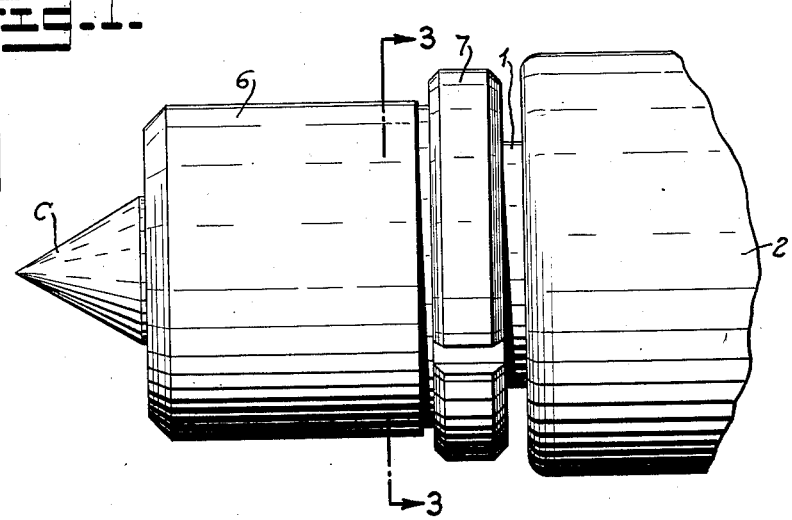
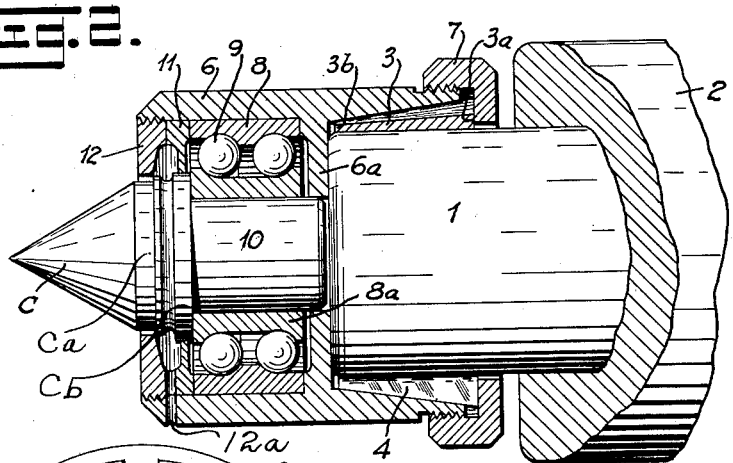
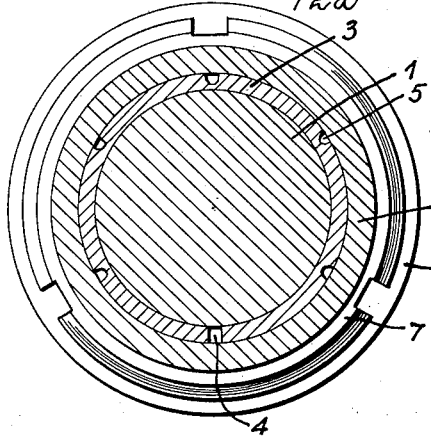
INVENTOR.
Harold Fish.
BY Mock + Blum
ATTORNEYS.

Patented Aug. 13, 1935

2,011,273

UNITED STATES PATENT OFFICE 2,011,273

REVOLVING CENTER FOR MACHINE TOOLS

Harold Fish, Stratford, Conn.

Application June 1, 1934, Serial No. 728,473

5 Claims. (Cl. 82—33)

My invention relates to a new and improved center for a lathe, grinder, or other machine tool.

An object of my invention is to provide an improved anti-friction center which can be operated at high speeds.

Another object of my invention is to provide a ball-bearing center for a lathe, which eliminates end play, and which is sealed in order to keep out dirt, etc., in order to overcome the necessity of additional lubrication.

Another object of my invention is to provide a center of this type in which a threaded collar draws the head of the center back to a solid bearing against the front end of the tailstock spindle.

Another object of my invention is to provide a center which can be readily taken off so that a drill, reamer, tap, or other tool can be used and the center can be replaced with accurate alignment.

Another object of my invention is to provide a split tapered bushing which is forced forwardly, tight and solid against the outside of the spindle.

Other objects of my invention will be set forth in the following description and drawing which illustrates a preferred embodiment thereof, it being understood that the above general statement of the objects of my invention is intended merely to generally explain the same and not to limit it in any manner.

Fig. 1 is a side elevation.

Fig. 2 is a central sectional view.

Fig. 3 is a sectional view on the line 3—3 of of Fig. 1.

The drawing shows a tailstock spindle 1, which is suitably connected to the tailstock 2. A bushing 3 fits snugly upon, and is mounted loosely upon the spindle 1. This bushing has a cut or space 4, at one portion of its periphery, so that the bushing 3 may be designated as a split bushing. Said bushing 3 is made of metal which has suitable resilience so that its internal diameter can be increased or diminished. The internal surface of the bushing 3 is cylindrical so that it fits snugly upon the spindle 1. The external surface of the bushing 3 is frusto-conical, and said outer surface of the bushing 3 is provided with longitudinal grooves or recesses 5.

Due to the tapered shape of the exterior surface of the bushing 3, each said groove 5 is deeper at its rear end than at its front end, measured at the outer surface of the bushing 3. The thickness of the rear lateral wall 3a of the bushing 3, up to the bottom of one of the grooves 5, may be equal to the thickness of the front lateral wall 3b of said bushing 3. Each said groove 5 has the major portion of its radial sides parallel to each other or inclined to each other. Said radial sides are inclined to each other at the lateral wall 3b, so that each groove has a pointed closed end at the front lateral wall 3b of the bushing 3.

The housing 6 for the outer ball-race 8 is provided with an external thread at its rear end. Said housing 6 may be provided with a lateral wall 6a which has a central opening and said lateral wall 6a can abut the front lateral wall of the spindle 1. The lateral wall 6a can be eliminated, and it may be replaced by a washer of equivalent shape. A clamping collar 7 can engage the threaded rear end of the housing 6. At its rear end the housing 6 is provided with a tapered recess or opening, in which the outer tapered surface of split collar or bushing 3 has a tight fit. When the clamping nut 7 is turned, the split bushing 3 is forced into the tapered opening which is provided at the rear of the housing 6 so that the split bushing 3 is contracted. This contraction causes the split bushing 3 to frictionally and tightly grip the spindle 1.

The outer ball-race 8 is mounted in the housing 6 and said outer ball-race 8 is of any suitable construction and it is provided with balls 9. Any suitable anti-friction bearing may be employed and I do not wish to be limited to the use of a ball-bearing.

The lathe center C is provided with a shank 10, to which the inner half 8a of the ball-race is connected. That is, the outer half 8 of the ball-race is connected to the housing 6 and the inner half 8a of the ball-race may be connected to the shank 10. This may be secured by means of a drive fit, a shrink fit, or any other tight fit.

The device is also provided with a retaining ring 11 which fits snugly within the housing 6 and which abuts the member 8. Said ring 11 does not abut the inner member 8a of the ball-race. The ring 11 fits closely against the adjacent part of the center C, but without contact, so that friction is eliminated. The ring 11 serves to retain the grease lubricant within the anti-friction bearing and to keep out dirt and dust.

The ring 11 is forced into position by a cover plate 12, which is externally threaded so that it can be threaded into the front internally threaded end of the housing 6. This cover plate 12 constitutes radial retaining means for preventing member 8 from shifting relative to member 6, and for retaining lubricant and to keep out dust. The inner surfaces of members 11 and 12 are as close to the center as possible, without actual contact. A drain hole 12a is provided for permitting cutting compound and dirt to pass out of the housing.

When the device is assembled, the lateral wall 6a of the housing 6 has its rear surface abutting the front lateral wall of the spindle 1. The front lateral wall 3b of the split bushing 3 is slightly spaced from said rear surface of a member 6a. The function of wall 6a is to provide a stop for the insertion of the outer ball-race 8. However, if member 6a is made separate from housing 6, the same result is secured.

The parts may be separated by reversely turning the clamping collar 7. The internal longitudinal wall of the collar 7 is threaded so that the clamping collar 7 can cooperate with the housing 6.

When the parts are assembled the rear lateral wall of the shank 10 is spaced from the spindle 1.

It will be noted that the collar 7 has an opening whose wall is spaced from the longitudinal surface of the spindle 1.

The front conical head C of the center is very accurately ground by means of an emery wheel.

This construction makes it possible to align the tip of the front conical head C with the axis of the non-turning tailstock spindle. The diameter or thickness of said spindle 1 may vary slightly. The use of the split resilient bushing 3, which may be made of high carbon steel or tool steel, or brass or the like, provides an allowance for such difference in thickness, when the bushing is radially contracted. Likewise, the bushing 3 uniformly and simultaneously exerts its clamping action around the entire inner surface of the tapered recess at the rear of the housing 6, so that the clamping does not throw the tip of head C off the axis of the tailstock spindle.

The center is provided with integral collars Ca and Cb, Cb being of greater diameter than Ca, in order to increase the efficiency with which grease is retained, and dirt and cutting compounds are kept out. The space between members 11 and 12 is a chamber from which dirt and cutting compound can escape, while the lubricating grease is kept within the ball bearing in an uncontaminated condition.

The member 11 may be designated as a supplemental cover plate.

I have shown a preferred embodiment of my invention, but it is clear that numerous changes and omissions could be made without departing from its spirit.

I claim:

1. In combination, a tailstock spindle, a housing, a center having its shank located in said housing and turnable relative to said housing, and holding means located within said housing and movable in a direction parallel to the axis of said spindle and adapted to clamp said housing to said spindle.

2. In combination, a spindle, a housing, a center having its shank located in said housing and turnable relative to said housing, the rear end of said housing being open and having a tapered interior wall, a split resilient bushing located in said rear end and surrounding the spindle, and having a tapered outer wall which substantially fits said tapered interior wall, and means adapted to compress said bushing so that it clamps said housing to said spindle.

3. In combination, a spindle, a housing, a center having its shank located in said housing and turnable relative to said housing, the rear end of said housing being open and having a tapered interior wall, a split resilient bushing located in said rear end and surrounding the spindle, and having a tapered outer wall which substantially fits said tapered interior wall, and means adapted to compress said bushing so that it clamps said housing to said spindle, said means comprising a collar having an opening through which said spindle passes, said opening being of greater diameter than said spindle, said collar having a threaded portion and the rear end of said housing having a corresponding threaded portion.

4. In combination, a spindle having a front lateral wall, a housing having a lateral member, a center having a shank located in said housing, an anti-friction bearing located in said housing between the inner wall of said housing and said shank, and means adapted to clamp the housing to the spindle with the lateral member of said housing abutting the lateral end wall of said spindle.

5. In combination, a spindle, a housing, a center having its shank located in said housing, an anti-friction bearing located said housing intermediate said housing and said center, means connecting said housing to the spindle and a cover plate at the front end of said bearing, and a second cover plate having a wall which is forwardly spaced from the adjacent wall of said first mentioned cover plate, said housing having an outlet intermediate said cover plates.

HAROLD FISH.